US008094644B2

(12) United States Patent
Ludwig et al.

(10) Patent No.: US 8,094,644 B2
(45) Date of Patent: Jan. 10, 2012

(54) METHOD AND SYSTEM FOR DYNAMICALLY CONFIGURING A TRAFFIC FLOW TEMPLATE

(75) Inventors: Reiner Ludwig, Hürtgenwald (DE); Niklas Sven Lundin, Torslanda (SE); Petter Johnsen, Arendal (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 340 days.

(21) Appl. No.: 12/299,443

(22) PCT Filed: May 4, 2007

(86) PCT No.: PCT/IB2007/001164
§ 371 (c)(1),
(2), (4) Date: May 18, 2009

(87) PCT Pub. No.: WO2007/129199
PCT Pub. Date: Nov. 15, 2007

(65) Prior Publication Data
US 2010/0008292 A1 Jan. 14, 2010

Related U.S. Application Data

(60) Provisional application No. 60/746,529, filed on May 5, 2006.

(51) Int. Cl.
*H04J 3/00* (2006.01)
(52) U.S. Cl. .......................... 370/349; 370/392; 370/401
(58) Field of Classification Search .......... 370/229–235, 370/252, 253, 328, 329, 338, 400, 401, 468, 370/349, 389, 392
See application file for complete search history.

(56) References Cited

U.S. PATENT DOCUMENTS

| 2003/0169771 | A1 | 9/2003 | Ahn et al. | |
| 2004/0151155 | A1* | 8/2004 | Jouppi | 370/401 |
| 2005/0041631 | A1* | 2/2005 | Aerrabotu et al. | 370/349 |

FOREIGN PATENT DOCUMENTS
WO    WO 02/073989 A    9/2002
* cited by examiner

*Primary Examiner* — Pao Sinkantarakorn

(57) ABSTRACT

A system and method for configuring a Traffic Flow Template, TFT, in real time. The present invention dynamically adapts the TFT to control the routing of downlink data packets from a GGSN to an MS. When the MS sends an uplink data packet on a premium bearer channel, a TFT controller extracts from the uplink data packet, parameters which include at least the destination address of the uplink data packet. A downlink packet filter subset for filtering downlink data packets is then defined as a function of the extracted parameters. For example, the downlink packet filter subset may identify downlink data packets having a source address that matches the destination address of the uplink data packet. The TFT is then modified as a function of the downlink packet filter subset to route the identified downlink packets through the premium bearer channel to the MS, and to route differently, downlink data packets having source addresses that do not match the destination address of the uplink data packet.

17 Claims, 4 Drawing Sheets

METHOD AND SYSTEM FOR DYNAMICALLY CONFIGURING A TRAFFIC FLOW TEMPLATE

RELATED APPLICATIONS

This application claims the benefit of the filing date of U.S. Provisional Patent Application No. 60/746,529 filed on May 5, 2006.

TECHNICAL FIELD

The present invention relates to data communication in wireless networks and user equipment. More particularly, and not by way of limitation, the present invention is directed to a system and method for dynamically configuring a Traffic Flow Template (TFT) in a Third Generation Partnership Project (3GPP) wireless communication network.

BACKGROUND

Operators usually offer an "Internet Access" service via a so-called default bearer. The default bearer enables packet transmission between a User Equipment (UE) and a gateway. User differentiation for a default bearer may be possible; that is, the service level of a particular user's default bearer could be "gold", "silver", or "bronze" based on a user's subscription data with the service.

In 3G networks the connection to an IP network is offered trough the use of bearers such as a PDP context or a Service Architecture Evolution (SAE) bearer. A bearer is a point-to-point connection from the user terminal to the IP network provided by either the operator or an Internet Service Provider (ISP). For each bearer it is possible to specify a Quality of Service (QoS) profile. The QoS profile contains parameters such as peak throughput, mean throughput, delay, and reliability.

It is also possible to activate more than one bearer for a given user. A bearer may be either a primary bearer or a secondary bearer. A primary, or default, bearer has a unique IP address assigned, while a secondary, or dedicated, bearer has the same IP address as the primary bearer if the secondary bearer is activated. The secondary bearer normally has a different QoS profile than the primary bearer. The primary bearer is typically activated to different Access Point Names (APNs), while the secondary bearer is connected to the same APN as the primary.

A typical scenario where a primary and a secondary bearer are activated is when there are both UDP and TCP traffic. A primary bearer with low reliability may be activated for the UDP traffic, and a secondary bearer with high reliability may be activated for the TCP traffic. Another scenario is a multimedia streaming session, in which there is one bearer with high throughput for the payload, and a second bearer with different characteristics for signaling.

When more than one PDP bearer is established for a user, different packets may be handled with different QoS and should therefore be put onto the correct bearer. Traffic from a Gateway GPRS Support Node (GGSN) towards the UE is put onto the correct bearer through the use of packet filtering specified by a Traffic Flow Template (TFT) (defined by 3GPP in Technical Specification 23.060). Each bearer can have a TFT specified. A TFT may contain up to eight packet filters, and each packet filter may contain attributes such as protocol number, source or destination port, or source IP address (and more). If a packet enters a downlink bearer, the packet must match at least one of the packet filters in the TFT.

FIG. 1 is a high level block diagram of an existing network configuration for directing downlink traffic to the correct PDP context or bearer. A Gateway GPRS Support Node (GGSN) 11 receives packets through an ISP connection 12. When more than one bearer is established, different packets may be handled with different QoS and the GGSN must put them onto the correct PDP bearer (for example, Context1 13 or Context2 14). The downlink packets are put onto the correct bearer through the use of packet filtering specified by Traffic Flow Templates (TFTs) 15 and 16 (defined by 3GPP in Technical Specification 23.060). Each TFT is associated with a particular bearer. A TFT may contain up to 8 packet filters, and each packet filer may contain attributes such as protocol number, source or destination port, or source IP address (and more). The ISP connection 12 provides the entire downlink flow to each TFT, and each TFT determines which packets meet the filter attributes for its associated bearer. A packet must match at least one of the packet filters in the TFT in order to enter the associated downlink bearer for transmission to the mobile station (MS) 17. Otherwise, the packet is dropped.

A problem arises when trying to configure the TFTs in the GGSN for downlink packet traffic. The TFTs must be configured manually prior to context activation, and if the TFTs are set static for the context, there may be some applications that have a behavior requiring the TFTs to be more dynamic. If the TFTs are set too general (broad), packets not belonging to the bearer may be allowed to enter, and if the TFTs are set too specific (narrow), packets belonging to the bearer may be rejected. Depending on the kind of traffic flowing, the packet attributes can be quite dynamic, which can lead to a need to use a broadly defined packet filter.

It would be advantageous to have a system and method for dynamically configuring TFTs that overcomes the disadvantages of the prior art. The present invention provides such a system and method.

SUMMARY

The present invention provides a system and method in which the Traffic Flow Template (TFT) is configured in real time as the traffic flows. The invention eliminates the difficult task of manually configuring the TFT prior to traffic flow, before it is determined which host is being communicated with and which application is running.

In one aspect, the present invention is directed to a method in a network node for dynamically adapting a TFT to control the routing of downlink data packets from the network node to a user node. The method includes the steps of receiving an uplink data packet sent on a premium bearer channel from the user node; extracting from the uplink data packet, parameters which include at least the destination address of the uplink data packet; and defining a downlink packet filter subset for filtering downlink data packets as a function of the extracted parameters. The downlink packet filter subset identifies downlink data packets having a source address that matches the destination address of the uplink data packet. The TFT is then modified as a function of the downlink packet filter subset to route the identified downlink packets through the premium bearer channel to the user node, and to route differently, downlink data packets having source addresses that do not match the destination address of the uplink data packet.

In another aspect, the present invention is directed to a network node operative to dynamically adapt a TFT to control the routing of downlink data packets from the network gateway to a user node. The network node includes means for receiving an uplink data packet sent on a premium bearer channel from the user node; means for extracting from the uplink data packet, parameters which include at least the destination address of the uplink data packet; and means for defining a downlink packet filter subset for filtering downlink data packets as a function of the extracted parameters. The downlink packet filter subset identifies downlink data packets having a source address that matches the destination address of the uplink data packet. The network node also includes means for modifying the TFT as a function of the downlink packet filter subset to route the identified downlink packets through the premium bearer channel to the user node, and to route differently, downlink data packets having source addresses that do not match the destination address of the uplink data packet.

In yet another aspect, the present invention is directed to a user terminal operative to send TFT control information to a network node to dynamically adapt a TFT in the network node, wherein the TFT controls the routing of downlink data packets to the terminal through a premium bearer channel as a function of the TFT control information received from the user terminal. The user terminal includes a first interface for sending uplink data packets on the premium bearer channel to the network node and for receiving downlink data packets on the premium bearer channel from the network node; a second interface for sending the TFT control information to the network node; and a TFT controller connected to the first and second interfaces for deriving the TFT control information based on parameters of an uplink data packet sent on the premium bearer channel to the network node. The TFT controller includes a parameter extractor for extracting parameters from the uplink data packet; and a filter definition unit for defining the TFT control information as a function of the extracted parameters.

BRIEF DESCRIPTION OF THE DRAWINGS

In the following section, the invention will be described with reference to exemplary embodiments illustrated in the figures, in which.

DETAILED DESCRIPTION

Figure 1:
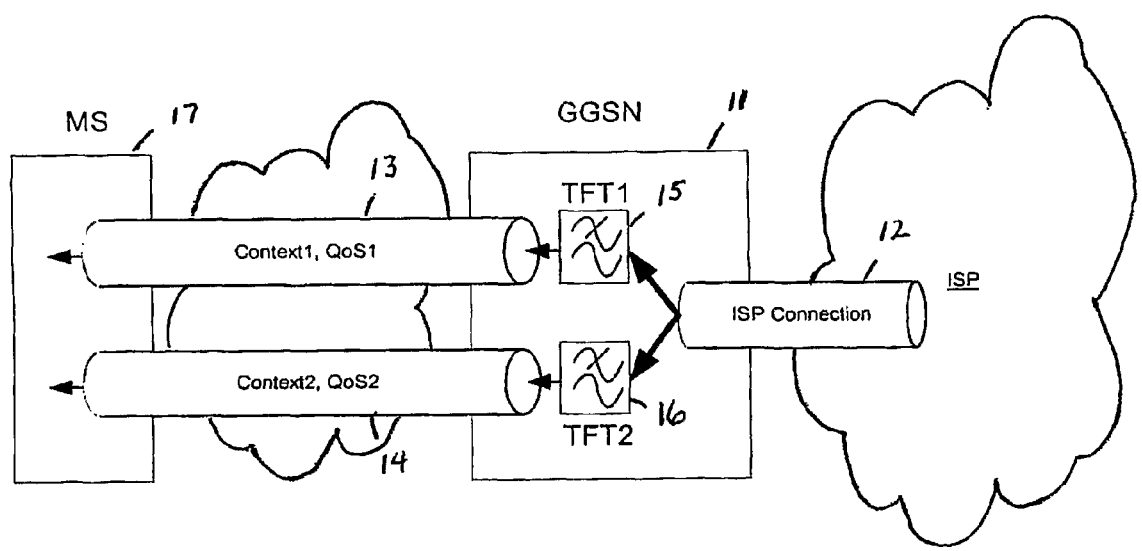
FIG. 1 is a high level block diagram of an existing network configuration for directing downlink traffic to the correct PDP context or bearer.
Figure 2:
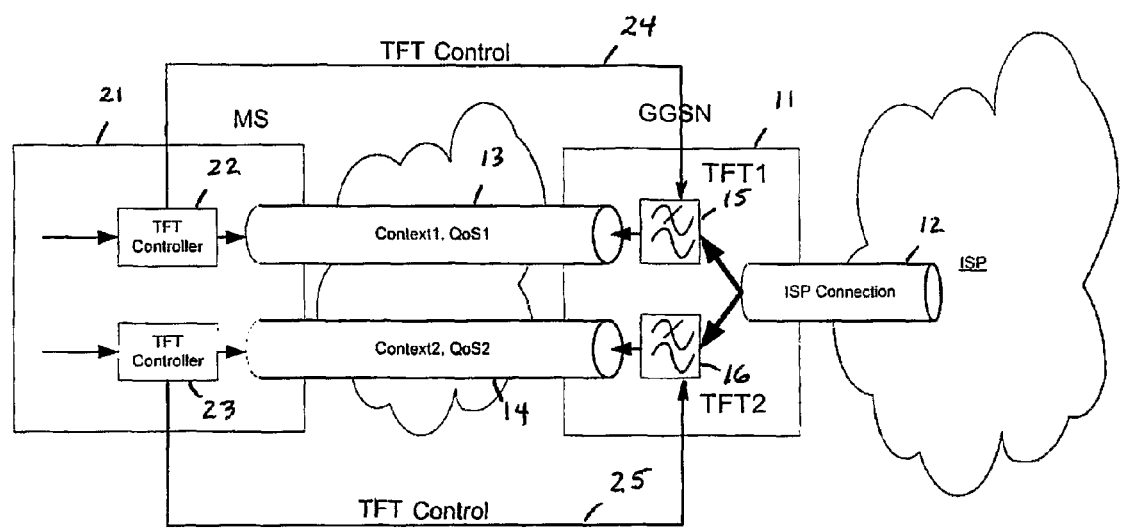
FIG. 2 is a high level block diagram depicting a TFT controller in accordance with a first embodiment of the present invention.

FIG. 2 is a high level block diagram depicting a TFT controller in accordance with a first embodiment of the present invention. In this embodiment, a modified MS 21 includes TFT controllers 22 and 23, which act as Uplink Packet Filters (ULPFs) for packets entering Context1 13 and Context2 14, respectively.

It should be noted that there are various ways in which a so-called premium bearer may be established. The premium bearer is a special purpose bearer (or logical channel, tunnel, context, etc.) for transporting packets belonging, for example, to a premium application. As a subscription service, the premium bearer may be pre-established by the GGSN when the MS attaches to the network at power on. This alternative is best suited for shared channel systems such as HSPA and LTE. Another alternative is to establish the premium bearer as an on-demand service. The user (human) explicitly requests the service, for example, by clicking a link on the operator's portal, or by calling the operator via phone ("premium service for 2 hours for X dollars") which then triggers the GGSN to initiate a corresponding secondary or dedicated bearer.

The TFT controllers 22 and 23 filter on predefined information parameters of the uplink traffic packets and place packets meeting the criteria for the premium application on the premium bearer. All other "Internet Access" client/peer applications are associated with the default service level. The network may also instruct, via SIP/SDP, chosen "Internet Access" client/peer applications to set DSCP="secondary" on uplink packets.

The TFT controllers also report predefined information parameters of the uplink traffic packets via TFT control signals 24 and 25 to TFT1 15 and TFT2 16 in the GGSN 11. This mechanism provides the configuration information needed by the downlink packet filters in TFT1 and TFT2 to place premium downlink packets on the premium bearer while placing all other packets on the default bearer. Most IP traffic is bi-directional (for example, TCP data+acks), and the premium traffic in both directions should go onto the premium bearer. It should be noted that a TCP download may be slowed down by either congestion on the data path or congestion on the ack path. The present invention helps to eliminate this congestion by dynamically configuring the TFTs with the proper filtering information so that packets can be properly directed even under changing conditions.

In one embodiment, the destination address of uplink packets is matched to the source address of downlink packets. The destination address of the uplink packets may take several forms, for example, simply the destination-IP-address or the destination-IP-address+destination-port-number. In this case, the GGSN 11 places downlink packets onto the same bearer from which the uplink packet with the matching address was received.

More advanced TFT controllers may also be utilized. For example, a TFT controller may filter on any combination of IP header fields, or may even filter beyond the IP header fields, for example based on URLs in HTTP requests (i.e., ULPF based on deep packet inspection).

Figure 3:
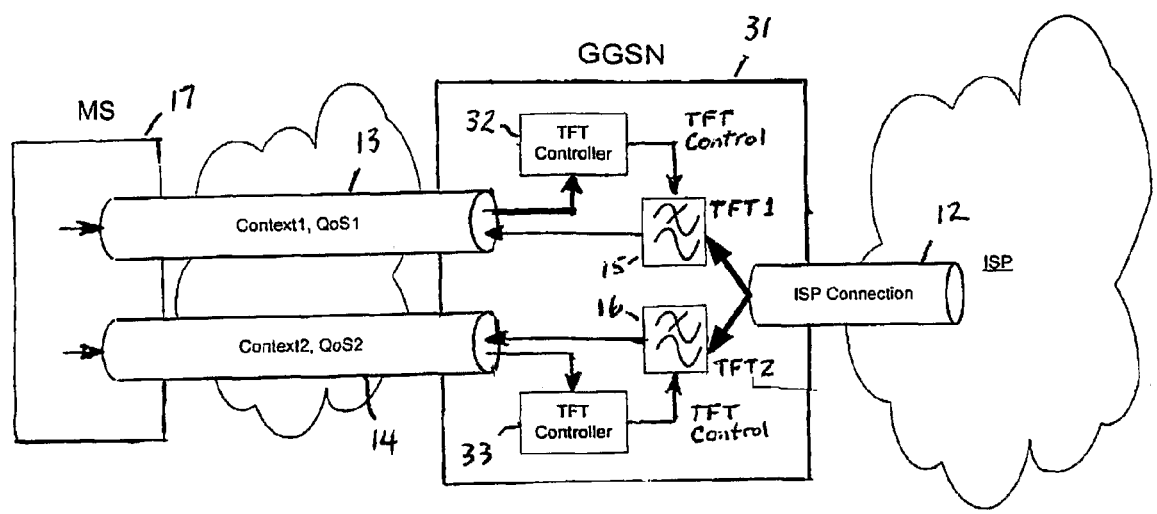
FIG. 3 is a high level block diagram depicting a TFT controller in accordance with a second embodiment of the present invention.

FIG. 3 is a high level block diagram depicting a TFT controller in accordance with a second embodiment of the present invention. In this embodiment, a GGSN 31 is modified to include TFT controllers 32 and 33. Once again, this embodiment is based on the fact that most Internet traffic has a symmetric behavior. That is, traffic tends to flow in both directions between two hosts. It is rare that traffic is unidirectional between two hosts. For example, for TCP traffic there will always be ACKs flowing in the opposite direction of the payload. This fact may be used to extract information from the uplink traffic that is used to configure the TFTs 15 and 16 in the GGSN for matching the expected downlink traffic.

To do this, it is assumed that packets flowing uplink are mapped to the correct context. The invention is also useful when a context with a wide scope allows packets that are rejected by a narrow TFT to flow downlink, typical in a best efforts manner.

The TFT controllers 32 and 33 include a mechanism for monitoring uplink traffic per context, and for extracting all or part of the following information parameters from the uplink packet:
Destination address;
Protocol number (IPv4);
NextHeader (IPv6);
Destination port;
Source port;

IP security parameter index;
Type of service (IPv4;
Traffic class (IPv6); and
Flow Label (IPv6).

The extracted information must be slightly modified before it can be used to determine the characteristics of an expected downlink packet. The modification may be as follows:

Destination address must be regarded as expected source address;

Destination port must be regarded as expected source port; and

Source port must be regarded as expected destination port. These are information elements that can be used as packet filter components when configuring packet filters in the TFTs 15 and 16.

Figure 4:
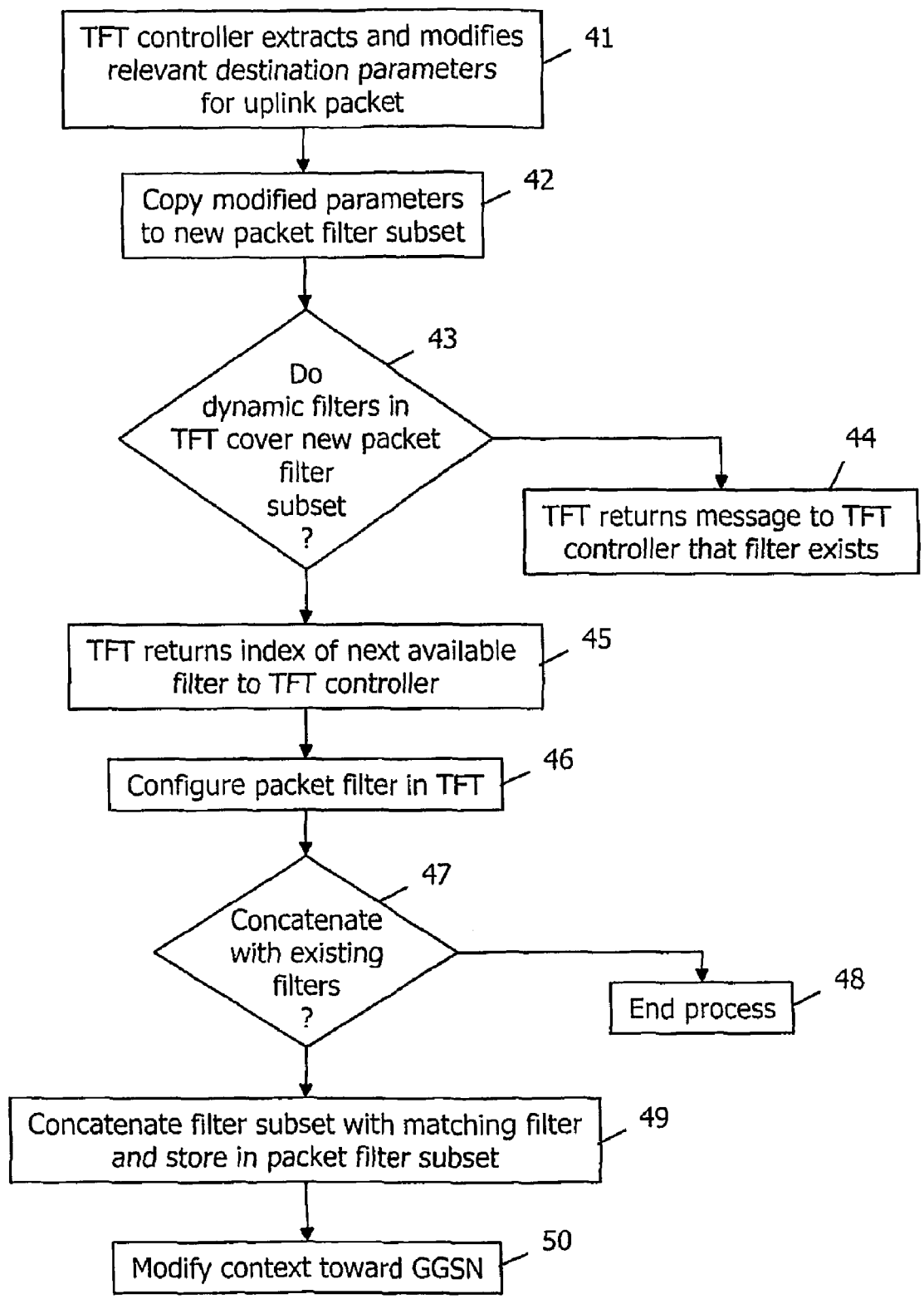
FIG. 4 is a flow chart of an embodiment of the method of the present invention.

FIG. 4 is a flow chart of an embodiment of the method of the present invention for modifying filter subsets for a premium bearer by the TFT controller 32 and 33. At step 41, the TFT controllers extract the relevant parameters listed above (source and destination address, source and destination port, etc.) from a premium uplink packet and modify the parameters for use with downlink packets as shown above. At step 42, the modified parameters are copied into a new packet filter subset. At step 43, the dynamic filters for the premium bearer in the appropriate TFT (for example TFT1 15) in the GGSN 31 are compared to the new packet filter subset to determine if the modified parameters copied from the uplink packet into the packet filter subset are covered by an existing dynamic filter. If so, the method moves to step 44 where TFT1 returns a response to the TFT controller 32 indicating the existence of the dynamic filter. If not, the method moves to step 45 where TFT1 returns an index to the next available filter. At step 46, a packet filter is configured in TFT1.

At step 47, a search of the existing filters will be made to determine if any of the existing filters can be concatenated with the newly constructed packet filter subset. The filters must match the protocol id and as many as possible of the other filter tags. If none of the existing filters can be concatenated with the newly constructed packet filter subset, the method ends at step 48. However, if a "matching filter" is found, the method moves to step 49 where the filter is concatenated with, and stored in, the packet filter subset. The concatenated filter contains the common parameters and wildcards for the differing parameters in the combined matching filter and packet filter subset. At step 50, the packet filter in the TFT identified by the filter index is configured with the appropriate information from the now modified packet filter subset, which results in a context modification toward the GGSN.

In its simplest form, the TFT controller may specify a filter with the expected source and destination port, expected source address, and protocol number. But since the number of packet filters are limited to 8, this approach limits the number of connections to 8 as well, since one packet filter is mapped to one connection. When more packet filters are configured, the TFT controller may try to concatenate packet filters. Packet filters with overlapping filter elements according to Table 1 below have the potential to be concatenated. Table 1 shows Protocol ID as one of the parameters, but for IPv6 traffic, this would be Next Header.

TABLE 1

|  | Concatenated Filter 1 | Concatenated Filter 2 | Concatenated Filter 3 | Concatenated Filter 4 |
|---|---|---|---|---|
| Source address | X | X | | |
| Protocol ID | X | X | X | X |
| Destination port | | X | | X |
| Source port | X | | X | |

For example, this would mean that if two packet filters are identical in the filter components source address, protocol id, and source port, but do not match in the destination port, they could be concatenated to one packet filter with a wider scope consisting of the common filter components.

Each packet filter in the TFT has an evaluation precedence field, which indicates the precedence of the packet filter compared to the other packet filters in the TFT. The TFT controller should set this high for narrow filters and lower for wider filters to ensure correct processing of the downlink packets. A narrow filter is a filter with many filter components. A wide filter is a filter with few components, and in special cases, only protocol ID is set.

In another embodiment when using a TFT controller, a user-configured packet filter is implemented in the TFT in addition to the packet filters created by the TFT controller. The user-configured packet filter may be utilized when the user has special requirements for packet handling. User-defined packet filters may be set in the PDP context activation procedure or in the PDP context modification procedure according to 3GPP 23.060.

The present invention provides the advantage that the TFT does not need to be configured before the traffic flows. The invention also eliminates the need for manual configuration, which is a difficult task because the traffic strongly depends on which host is being communicated with and which application is running.

In alternative embodiments, the TFT controller may be implemented in the GGSN, the MS, the driver in the connected terminal equipment (TE), or in any network node through which the data packets pass between the MS and the GGSN. For example, the TFT controller may be implemented in a base station or Serving GPRS Service Node (SGSN) serving the MS. The TFT controller may also be implemented in a 3GPP Packet Data Network (PDN) Gateway or Serving Gateway as defined in 3GPP Technical Specification 23.401 v0.4.1, or in an evolved Packet Data Gateway (ePDG) as defined in 3GPP Technical Specification 23.402 v0.4.0.

The invention is not limited to the parameters used in text and example, but could include other parameters from the packet filters. As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a network node for dynamically adapting a Traffic Flow Template (TFT) to control the routing of downlink data packets from the network node to a user node, the method comprising the steps of:

receiving an uplink data packet sent on a premium bearer channel from the user node;

extracting parameters from the uplink data packet, the parameters comprising at least the destination address of the uplink data packet;

defining a downlink packet filter subset for filtering downlink data packets as a function of the extracted parameters, wherein the downlink packet filter subset identifies downlink data packets having a source address that matches the destination address of the uplink data packet; and modifying the TFT as a function of the downlink packet filter subset to route the identified downlink packets through the premium bearer channel to the user node, and to route differently, downlink data packets having source addresses that do not match the destination address of the uplink data packet.

2. The method recited in claim 1, wherein the step of modifying the TFT includes the steps of:

comparing the downlink packet filter subset to existing downlink packet filters in the TFT for the premium bearer to determine whether one of the existing downlink packet filters permits the routing of the identified downlink packets through the premium bearer channel; and when there is not an existing downlink packet filter that permits the routing of the identified downlink packets through the premium bearer channel, updating one of the existing downlink packet filters, as a function of the downlink packet filter subset, to permit the routing of the identified downlink packets through the premium bearer channel.

3. The method recited in claim 1, wherein the step of modifying the TFT includes adding the downlink packet filter subset to the TFT.

4. The method recited in claim 1, wherein the steps of extracting and defining a packet filter subset are performed by a TFT Controller in the network node.

5. The method recited in claim 4, wherein the method is performed in a Gateway General Packet Radio Service (GPRS) Support Node (GGSN).

6. The method recited in claim 4, wherein the method is performed in a 3GPP Packet Data Network (PDN) Gateway.

7. The method recited in claim 4, wherein the method is performed in a 3GPP Serving Gateway.

8. The method recited in claim 4, wherein the method is performed in a 3GPP evolved Packet Data Gateway (ePDG).

9. A network node operative to dynamically adapt a Traffic Flow Template (TFT) to control the routing of downlink data packets from the network gateway to a user node, the network node comprising:

means for receiving an uplink data packet sent on a premium bearer channel from the user node;

means for extracting parameters from the uplink data packet, the parameters comprising at least the destination address of the uplink data packet;

means for defining a downlink packet filter subset for filtering downlink data packets as a function of the extracted parameters, wherein the downlink packet filter subset identifies downlink data packets having a source address that matches the destination address of the uplink data packet; and means for modifying the TFT as a function of the downlink packet filter subset to route the identified downlink packets through the premium bearer channel to the user node, and to route differently, downlink data packets having source addresses that do not match the destination address of the uplink data packet.

10. The network node recited in claim 9, wherein the means for modifying the TFT includes:

means for comparing the downlink packet filter subset to existing downlink packet filters in the TFT for the premium bearer to determine whether one of the existing downlink packet filters permits the routing of the identified downlink packets through the premium bearer channel; and means, responsive to a determination that none of the existing downlink packet filters permits the routing of the identified downlink packets through the premium bearer channel, for updating one of the existing downlink packet filters as a function of the downlink packet filter subset to permit the routing of the identified downlink packets through the premium bearer channel.

11. The network node recited in claim 9, wherein the network node comprises a Gateway General Packet Radio Service (GPRS) Support Node (GGSN).

12. The network node recited in claim 9, wherein the network node comprises a Serving General Packet Radio Service (GPRS) Support Node (SGSN) serving the user node.

13. The network node recited in claim 9, wherein the network node comprises a 3GPP Packet Data Network (PDN) Gateway.

14. The network node recited in claim 9, wherein the network node comprises a 3GPP Serving Gateway.

15. The network node recited in claim 9, wherein the network node comprises a 3GPP evolved Packet Data Gateway (ePDG).

16. The network node recited in claim 9, wherein the network node comprises a base station serving the user node.

17. A user terminal operative to send Traffic Flow Template (TFT) control information to a network node to dynamically adapt a TFT in the network node, said TFT controlling the routing of downlink data packets to the terminal through a premium bearer channel as a function of the TFT control information received from the user terminal, the user terminal comprising:

a first interface for sending uplink data packets on the premium bearer channel to the network node and for receiving downlink data packets on the premium bearer channel from the network node;

a second interface for sending the TFT control information to the network node; and a TFT controller connected to the first and second interfaces for deriving the TFT control information based on parameters of an uplink data packet sent on the premium bearer channel to the network node, wherein the TFT controller includes:

a parameter extractor for extracting parameters from the uplink data packet, wherein the extracted parameters comprise at least the destination address of the uplink data packet; and a filter definition unit for defining the TFT control information as a function of the extracted parameters, wherein the TFT control information causes the TFT to identify downlink data packets having a source address that matches the destination address of the uplink data packet.

* * * * *